United States Patent [19]

Whetham

[11] 4,131,837

[45] Dec. 26, 1978

[54] MACHINE TOOL MONITORING SYSTEM
[75] Inventor: William J. Whetham, Seattle, Wash.
[73] Assignee: The Boeing Company, Seattle, Wash.
[21] Appl. No.: 815,150
[22] Filed: Jul. 13, 1977

Related U.S. Application Data

[63] Continuation-in-part of Ser. No. 740,627, Nov. 10, 1976, abandoned, which is a continuation-in-part of Ser. No. 596,709, Jul. 17, 1975, abandoned.

[51] Int. Cl.$^2$ .............................................. G05B 13/00
[52] U.S. Cl. ..................................... 318/571; 408/11; 318/561; 364/474
[58] Field of Search ............... 318/571, 572, 561, 566; 235/151.11; 408/11

[56] References Cited

U.S. PATENT DOCUMENTS

| | | | |
|---|---|---|---|
| 3,573,588 | 11/1971 | Geyer et al. | 318/571 |
| 3,720,120 | 3/1973 | Cutler | 318/571 X |
| 3,777,125 | 12/1973 | Whetham | 235/151.11 |
| 3,849,712 | 11/1974 | Lankford et al. | 318/561 |
| 3,986,010 | 10/1976 | Lankford et al. | 235/151.11 |

Primary Examiner—Herman J. Hohauser
Attorney, Agent, or Firm—Cole, Jensen & Puntigam

[57] ABSTRACT

During machine tool operation a first set of sensors, referred to as cutter deflection sensors, provides data which is representative of the physical deflection of the cutting tool from a rest position, while a second set of sensors, referred to as position sensors, provides data which is representative of the position of the workpiece mounted on the machine tool relative to a reference or setpoint position. The cutter deflection and workpiece position data are combined to produce a resultant which is representative of the actual position of the cutting tool relative to the workpiece. This resultant is then compared with reference data which is representative of the desired position of the cutting tool relative to the workpiece. The difference between the actual and desired positions is then compared with a preselected tolerance value. The machine tool is then either (1) permitted to continue at its programmed speed, (2) slowed down or (3) stopped, depending on the value of the difference data compared to the tolerance value.

7 Claims, 4 Drawing Figures

MACHINE TOOL MONITORING SYSTEM

BACKGROUND OF THE INVENTION

This application is a continuation-in-part of application Ser. No. 740,627, filed Nov. 10, 1976, titled MACHINE TOOL POSITION MONITORING SYSTEM, now abandoned which in turn is a continuation-in-part application Ser. No. 596,709, filed July 17, 1975, titled MACHINE TOOL POSITION MONITORING SYSTEM, and now abandoned.

The present invention relates generally to systems for automatically controlling machine tools, and more particularly concerns a system which provides an actual value of the position of the cutting tool relative to the workpiece, and then uses that information to partially control the operation of the machine tool.

In a machine tool such as a milling machine, metal removal from a workpiece is accomplished by rotating a cutting tool against the workpiece, which is moved at a predetermined feedrate relative to the cutting tool. Such a machine tool is shown in FIG. 1, wherein a milling machine of the conventional horizontal bed mill type includes a longitudinal base 12, upon which is disposed a first pair of rails 14.

A first milling table 16, which supports a workpiece 18, is disposed on rails 14 and moved therealong in a longitudinal, or X axis, direction by a first motor and gear arrangement, not shown, which is housed in a casing 20. Disposed at a right angle to rails 14 is a second pair of rails 22, secured to casing 20. A second milling table 24 is disposed on rails 22 and is moved in a vertical, or Z axis, direction by a second motor and gear arrangement, not shown, which is also housed in casing 20.

Table 24 itself has a third pair of rails 26 mounted thereon. A cutter assembly 28 is disposed on rails 26, and is moved in a transverse, or Y axis, direction by a third motor and gear arrangement, not shown, which is preferably housed within cutter assembly 28. Cutter assembly 28 also houses a fourth motor and gear arrangement which in operation rotates a spindle, which in turn extends in the Y axis direction and terminates, through various adapters, in a cutting tool 30. Cutting tool 30, in the operation of the machine tool, is brought into engagement with the workpiece in a controlled manner to produce the desired product.

With machine tools of this general type, the term "feedrate" can be defined as the rate of movement of the workpiece relative to cutting tool 30 in any one or combination of the three coordinate directions, X, Y and Z, by movement of table 16 or 24 or cutter assembly 28. In many modern machine tools which produce complex parts at a high rate of speed, the feedrate is controlled automatically.

In operation, milling machine 10 is supplied with signals controlling its feedrate, in form of position commands, by a numerical control (N/C) unit 32. N/C units of this type are well known in the art, and generally comprise a plurality of digital computer circuits which convert information and instructions, e.g. feedrate and motion coordinates, present on a program tape into commands for the control of the milling machine.

Of course, for different milling operations and for different workpieces, different program tapes are required. Included on each tape are a plurality of sequenced instructions which define the details of a machining process necessary to produce a finished workpiece of desired dimension and tolerance. Although one of the instructions provided by the tape usually is the desired feedrate in one or more of the three coordinate directions, it is also common for the operator to manually enter the feedrate into numerical control unit 32 during one or more steps of the milling process.

In the manufacture of complex aerospace hardware, numerically controlled machines are used extensively, because they operate with a degree of reliability, speed and accuracy not obtainable with conventionally controlled machines. Such N/C machines are still, unfortunately, subject to operating errors and breakdowns. Because the parts produced by these machines are so complex, the scrapage of a single part due to machine error or malfunction could result in the loss of several thousands of dollars in both raw material and lost machine time.

The most significant problem in the art concerns insuring that finished parts are within specified tolerances. Even though present machines are very accurate, a thorough quality control inspection still must be performed to verify that a finished part is within the specified tolerances. Occasionally a part must be rejected, resulting in significant lost time and money. Presently, the inspection can sometimes cost almost as much as the machining of the part itself. Hence, reliable but inexpensive methods of insuring that a finished part is within tolerance is needed.

A different, but related problem associated with N/C machines concerns maintenance. N/C machines are very complex, both in structure and operation. A malfunction or failure of any part may severely affect the operation of the entire machine and the accuracy of the machining process. Reliable methods are needed to locate and repair defective or about-to-fail parts before a major breakdown occurs, which costs thousands of dollars in both maintenance and machine downtime.

Special N/C inspection machines have been developed which determine if a given finished part is within manufacturing tolerances. Most of these machines, however, require either a contact or non-contact probe to be moved about the part to sense its geometry. These machines require large amounts of inspection time and are extremely expensive; furthermore, their function is limited solely to inspection of parts.

Special techniques have also been developed to solve the related problem of machine malfunction. Machine position monitoring systems have been developed to aid in determining N/C machine servo errors and machine tool positioning accuracy. This has been accomplished in the past by monitoring the position of the N/C machine by means of laser interferometers or similar devices. The information obtained from these devices assists in the discovery of possible causes of machine malfunctions, and in preventing part ruination, but they are costly and are impractical when they serve no other useful purpose.

The so-called "template" technique is another method which has been employed in the past to monitor the accuracy of N/C machines during operation, thereby preventing machine malfunction of failure from damaging the particular part being machined, and further, identifying sources of machine malfunction before a major failure occurs. The template technique also gives some tolerance information. In the template technique, a finished part is used as a template, the finished part being mounted on one of machining positions of a multi-spindle machine. A contact transducer is substituted for the cutting tool in that position. If the transducer senses contact with the template, the machine is shutdown automatically.

Although this technique effectively eliminates the possibility that finished parts will be undersize, and is helpful in preventing the ruination of a part due to machine malfunction, the technique does have several disadvantages. In a three spindle machine, for instance, the template technique reduces machine productivity by ⅓, since the spindle being used with the template is not producing a finished part. In addition, if the part is to be machined in several passes, a different template must be used for each pass, time-consuming function. Also, since the template technique only stops the machine if the contact transducer touches the template, it is possible that oversize parts may still result, in the event that the cutting tool removes less from the workpiece than the amount specified in the instructions. Hence, a separate quality control inspection is still required for parts manufactured using the template techniques.

Therefore, it is a general object of the present invention to provide an improved machine tool monitoring system which overcomes one or more of the disadvantages of the prior art noted above.

It is another object of the present invention to provide such a system which will virtually eliminate the need for an inspection process on finished workpieces.

It is a further object of the present invention to provide such a system which will accurately monitor machine performance, in order to both eliminate the production of rejected parts and allow timely preventive maintenance of the machine and its components.

SUMMARY OF THE INVENTION

Accordingly, the present invention is an improvement in a numerical control machine which includes (1) a first support which supports the workpiece relative to a machine reference position such that the position of the workpiece can be ascertained, (2) a second support which supports a cutting tool relative to the machine reference position such that the undeflected position of the cutting tool means can be ascertained, (3) a cutting tool which is operable to remove material from the workpiece when the machine tool is in operation, the cutting tool deflecting from a rest position during removal of material from the workpiece, (4) means for moving the first and second support means such that the workpiece and the cutting tool move relative to each other, and (5) a controller, which controls the relative movement of the first and second supporting means in accordance with programmed instructions, so as to produce a product of selected configuration and size. The improvement in the above apparatus includes (1) first determining means, such as an arrangement of sensors, for measuring the position of said first and second supporting means relative to the machine reference position at a given point in time, which is indicative of the actual position of the undeflected cutting tool relative to the workpiece, (2) second determining means for determining the deflection of the cutting tool from its rest position during operation of the machine tool at the given point in time, (3) means for combining the data from the first and second determining means into a resultant, which is representative of the actual or true position of the cutting tool relative to the workpiece at the given point in time, and (4) means which is responsive to (a) the resultant signal from the combining means, (b) reference information obtained from the programmed instructions which is representative of the desired position of the cutting tool relative to the workpiece at the given point in time, and (c) a pre-established tolerance value, to produce a signal to override the programmed instructions in the following circumstance: when the difference between the resultant and the reference information reaches a predetermined fraction of the tolerance value, the operation of the machine is slowed, to insure that the product will be within the specified tolerance.

DESCRIPTION OF THE PREFERRED EMBODIMENT

The objectives of the present invention are accomplished by determining both the amount of cutting tool (cutter) deflection, by means cutter deflection sensors, and the change in machine position from a set-point, by means of position sensors, combining that information into a single resultant, which is representative of actual cutter position relative to the workpiece, and then comparing that resultant with a known reference value representative of the desired position of the cutter relative to the workpiece. The difference between the resultant and the reference value is then compared with a pre-established tolerance value and then feedrate of the machine, which is otherwise controlled by an N/C controller unit, is varied as follows.

If the ratio of the difference to the tolerance value is within a first percentage range, the machine continues to operate under its input instructions from the N/C controller unit. If the ratio is within a second percentage range, the feedrate of the machine is slowed. If the ratio is higher than the second percentage range, the machine is shutdown.

The system of the present invention solves, in a single evaluative system, the two principle problems discussed above, namely, the requirement of post production quality control inspection, and the detection of machine malfunction.

Figure 1:
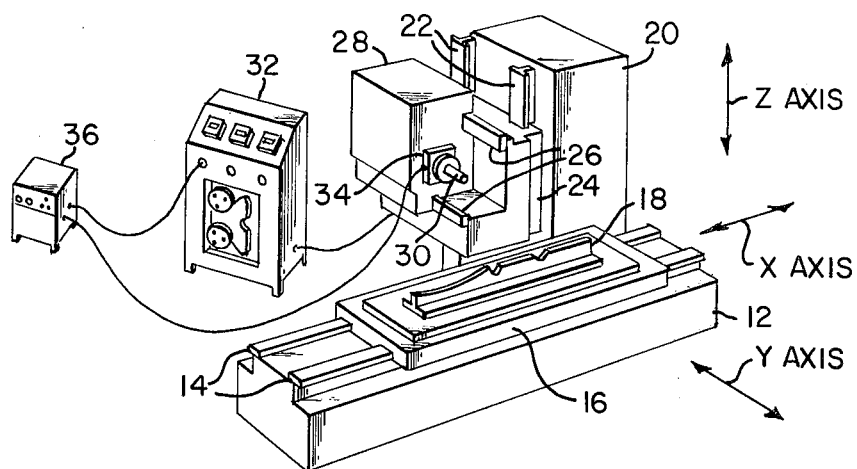
FIG. 1 is a pictorial representation of a prior art system employing numerical control of a milling machine.

Means for separately determining the amount of cutting tool deflection and the change in machine position are known in the art. For measurement of cutter deflection, the present invention includes a first set of sensors, referred to as cutter deflector sensors, which are arranged into what has been previously termed an adaptive control system. In my U.S. Pat. Nos. 3,602,090, 3,735,157, 3,759,139 and 3,777,125, I described a sensor arrangement suitable for determination of cutting tool deflection. Such a sensor arrangement is shown in FIG. 1 as cutter deflection sensor assembly 34, which is disposed in proximity to the spindle of cutter assembly 28.

According to the teaching of the above patents, the cutter deflection sensors disposed in assembly 34 provide an output signal corresponding to the actual milling force exerted on the spindle or cutter during machining operations. This output signal, which is representative of actual milling force, is determined solely from spindle or cutter deflection, which is in turn measured by the cutter deflection sensors.

Figure 2:
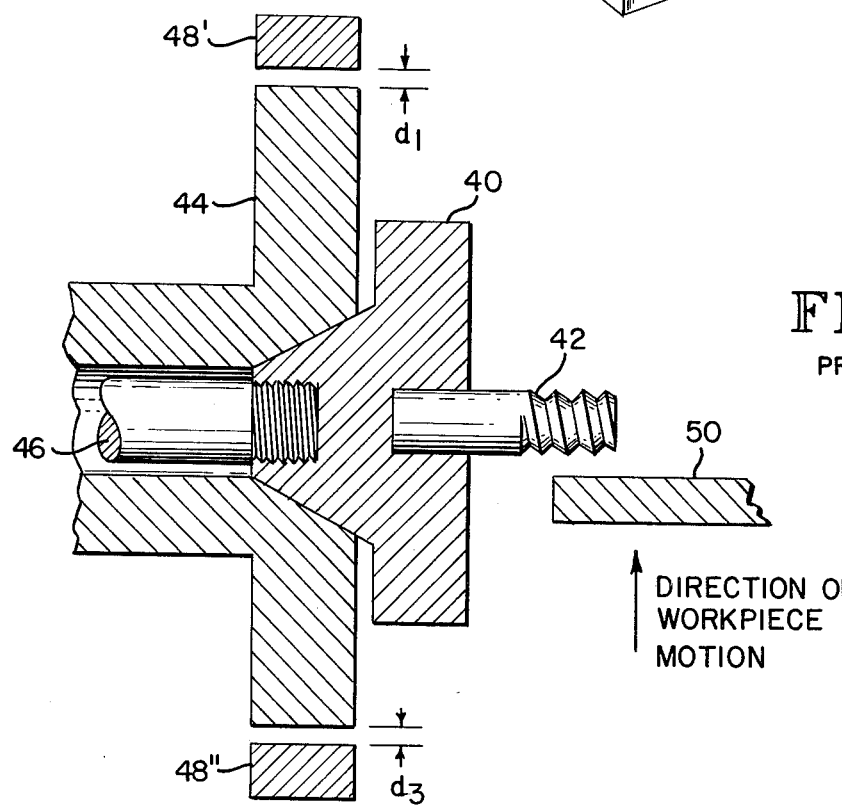
FIG. 2 is a cross-sectional view of a cutting tool holding assembly employing cutter deflection sensors.

The operation of the cutter deflection sensor arrangement is shown for one axis in FIG. 2. The principal of operation for each of the three axes of movement for the cutting tool 42 is the same. Tool holder 40, containing cutting tool 42, is held firmly in contact with tool-holding flange 44 by a cutter draw bar 46. Sensors 48' and 48" are located on opposite sides of tool-holding flange 44 as shown, and are connected in a balanced electrical bridge circuit (not shown) in a manner such that under no load conditions for tool 42, the outputs from sensors 48' and 48" are equal and opposite, resulting in a no-voltage bridge signal.

When cutting tool 42 engages workpiece 50, cutting tool 42 deflects, resulting in a deflection of tool holder 40 and tool holder flange 44. As a result, for instance, of an upward deflection of tool-holder flange 44, the distance $d_3$ between flange 44 and sensor 48" is increased and the distance $d_1$ between flange 44 and sensor 48' is correspondingly decreased. This causes the bridge to go unbalanced, resulting in turn in a bridge signal which is proportional to the amount of deflection of flange 44 and hence also of the deflection of tool 42.

Numerous data tables have been derived which relate cutter geometry to cutter deflection, so that a given bridge signal can be easily related in turn to a particular amount of cutter deflection. Hence, the output of the bridge circuit for each axis is a voltage which is representative of the actual cutter deflection in that axis.

In the embodiment of the invention shown and described herein, a three axis deflection sensor assembly 34 is shown, although only information from the X and Y axes is actually used. It should be understood, of course, that information from the Z axis sensor, as well as from other axes, can easily be obtained by adding the appropriate sensors in the desired locations and connecting each into a balanced bridge circuit. The output of each bridge circuit will be a voltage representative of cutter deflection in the direction coincident with that axis.

Figure 3:
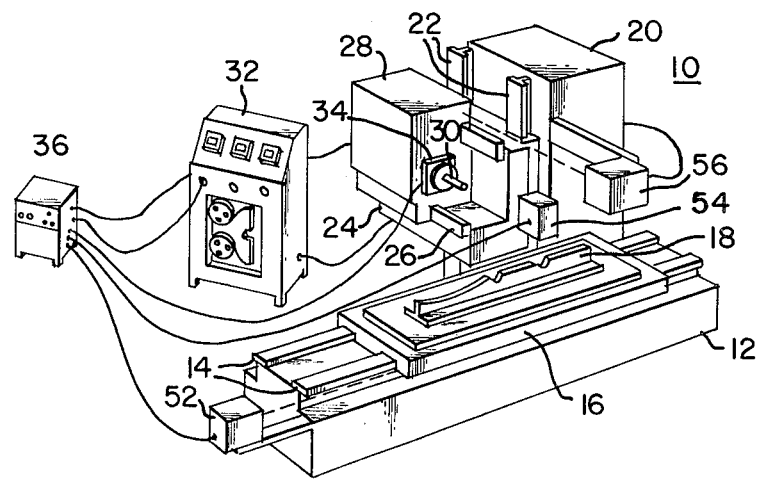
FIG. 3 is a pictorial representation of a milling machine, similar to that shown in FIG. 1, but modified in accordance with the principles of the present invention.

For measurement of the change in machine position, the present invention includes a second set of sensors which determine the change in position of each machine table relative to a reference, or set-point, position. Referring to FIG. 3, each axis of movement of the machine in the embodiment shown and described, namely the X, Y and Z axes, has its own position sensor, shown as sensor 52 for the X axis, sensor 56 for the Y axis and sensor 54 for the Z axis. In the embodiment shown and described, this set of position sensors is redundant to another set of position sensors, not shown in FIG. 3, which assist in controlling the operation of the machine via feedback in accordance with conventional N/C machine principles.

Sensors 52, 54 and 56 in operation measure the change in position of table 16, table 24 and cutter assembly 28, respectively, relative to their reference positions. An actual change in the position of one or more of table 16, table 24 and cutter assembly 28 is referred to as a change in machine position. In accordance with known machine techniques, workpiece 18 is secured to table 16 so that it is at a known set-point position when table 16 is set at its reference position. Table 24 and cutter assembly 28 are also initially set at a reference position. When tables 16 and 24 and cutter assembly 28 are all at their reference positions, the machine tool is said to be zeroed, and the position of the cutting tool relative to the workpiece is known.

The combined output of sensors 52, 54 and 56, then, will be representative of the actual position of workpiece 18 relative to the position of undeflected cutting tool 30, when there is a change in machine position. While in the present embodiment sensors 52, 54 and 56 are laser interferometers, the present invention is operable using other types of sensors which will accurately measure machine movement, such as resolvers or linear transducers.

Figure 4:
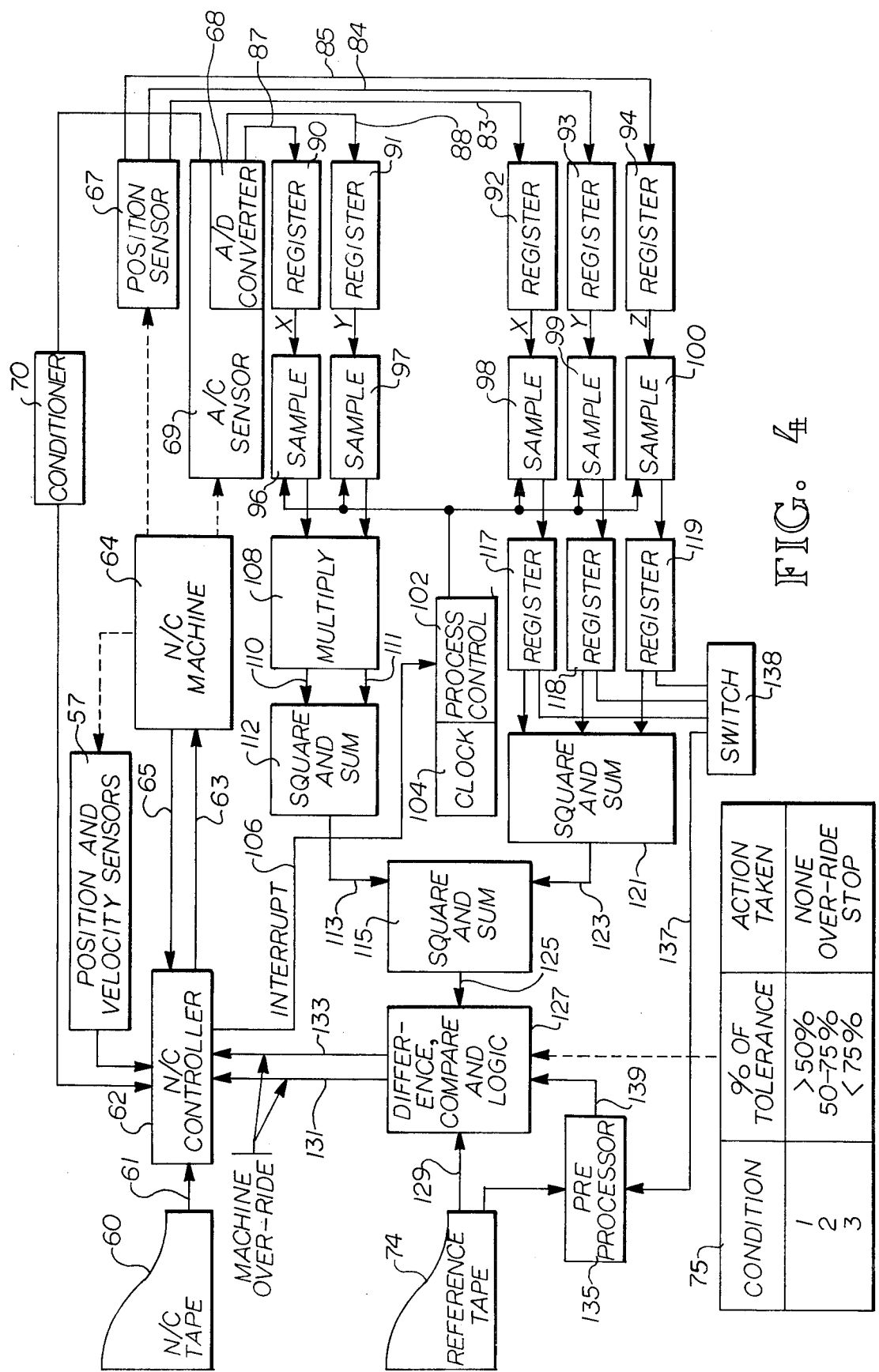
FIG. 4 is a block diagram of the system of the present invention.

FIG. 4 shows, in functional block diagram form, the monitoring system of the present invention, using data from the conventional deflection and position sensors described above, in the context of a N/C machine tool.

N/C tape 60 is initially read by appropriate reader means (not shown) to obtain the necessary feedrate and motion input data 61, which is in turn supplied to N/C controller 62. Machining instructions 63 are then generated by N/C controller 62, in response to data 61, for control of N/C machine 64. N/C machine 64, in response to instructions 63, then operates on the workpiece.

Information concerning machine position and velocity is fed back to N/C controller 62 by a first set of position sensors 57 in a conventional feedback loop, as is machine status data 65, such as drive motor torque. The data fed immediately fed back to N/C controller 62 form part of conventional machine control systems and comprise techniques known in the prior art, as demonstrated by U.S. Pat. No. 3,777,095 to Kirkham.

A second set of position sensors, shown as a group at 67 and redundant to position sensors 57, provides data to the monitoring system of the present invention on lines 83, 84 and 85, one line for each axis (X, Y, and Z) of machine movement. Cutter deflection data, originated by cutter deflection sensors shown as a group at 69, is provided to the monitoring system through A/D converter 68 on lines 87 and 88 for the X and Y axes. Cutter deflection data also is fed back in a conventional manner, through signal conditioner 70, to N/C controller 62 to slow the machine feedrate if the cutter deflection exceeds a specified value. This feed-back control technique is explained in detail in the above-mentioned patents.

Data on lines 87 and 88 is applied, respectively, to conventional storage registers 90 and 91, while data on lines 83, 84 and 85 is applied, respectively, similar to storage registers 92, 93 and 94.

The data in registers 90 through 94 is sampled upon each occurrence of an interrupt signal generated by N/C controller 62, as explained hereinafter, and at selected intervals between interrupts, by sampling circuits 96, 97, 98, 99 and 100, which are, respectively, uniquely associated with one register. Sampling circuits 96-100 are under the control of a process control circuit 102, which includes a clock 104.

An interrupt signal from N/C controller 62 on line 106 occurs at the end of a physical section or length of cutter movement relative to the workpiece, i.e. a physical section of the workpiece over which the cutter has removed material. This length is referred to as a machine "block" and is variable in length, depending on the desired configuration or outline of the workpiece.

The machining instructions on N/C tape 60 occur in groups, at each point where continued machining under the last instruction would produce a result which deviates from the desired result by a specified tolerance amount. The actual machining which occurs between successive instructions is thus a machine block.

Since the movement of the cutting tool must either follow a straight line, or one of a limited number of pre-established programmed curves, a desired part outline which does not follow either a straight line or such a curve can only be produced by continuous correction through programmed instructions supplied by the data tape. The tape is programmed so as to provide new instructions when the position of the cutting tool in following the last instruction has departed from the position necessary to produce the desired outline.

In a typical circumstance, a new instruction might be provided when there is a theoretical difference of 1/10 of the specified part tolerance, e.g. one ten-thousandth of an inch. The new instruction will change the cutter direction slightly, so as to approximate, as close as possible, the desired outline of the part. Thus, each time an instruction occurs, one block terminates and the next one begins. Hence, the length of a block, and thus the time of a block, is variable, depending upon the desired outline of the finished workpiece, and to an extent, upon the capability of the machine.

At the end of each successive block, an interrupt signal is supplied by tape 60 through N/C controller 62 to process control circuit 102, which in turn energizes sample circuits 96 through 100 to sample the cutter deflection data and the position data stored in registers 90–94.

The data from sensors 69, which flows continuously into registers 90 and 91, is a DC voltage on the order of 0 to 10 volts. The 0–10 VDC represents a range of cutter deflection typically from 0 to 50/1000's inch. In registers 90 and 91, the data is converted into a 16 bit binary number. This data is then sampled and applied to multiplier circuit 108 which multiples the data by a constant, which is obtained from known tables relating actual cutter deflection to cutter deflection voltage. The signals from multiplier circuit 108 are representative of actual cutter deflection in each axis, represented in binary form.

The signals from multiplier circuit 108 are applied, respectively, over lines 110 and 111 to a first square and sum circuit 112, which squares the values on each input line, sums each squared value and then calculates the square root of the sum. The other circuits referred to herein as square and sum circuits operate similarly. The resulting value from square and sum circuit 112 is then applied on line 113 as one input to a second square and sum circuit 115.

Concurrently, data in the form of a 40 bit BCD number continuously flows into registers 92–94 from position sensors 67. The BCD number is representative of machine position changes covering a range of 0 to 99 inches in the embodiment shown. The BCD number is coverted to a 32 bit binary number in registers 92–94. As a result of an interrupt signal from controller 62, sample circuits 98–100 transfer data from registers 92–94 to registers 117–119. The output of registers 117–119 is a 32 bit binary number and is applied to a third square and sum circuit 121. The resulting output from third square and sum circuit 121 is applied over line 123 as a second input to second square and sum circuit 115.

The two inputs to second square and sum circuit 115 on lines 113 and 123 are then squared, summed, and square rooted to produce a 32 bit binary resultant on line 125 which is representative of the actual position of cutting tool 30 relative to workpiece 18 during machining operations at a particular point in time, i.e. the point in time of the interrupt. This resultant is provided as one input to a difference, compare and logic (DCL) circuit 127. Another input to DCL circuit 127 is supplied from reference tape 74 on line 129, and is a 32 bit binary number representative of the desired position of cutting tool 30 relative to the workpiece 18 at said particular point in time.

The difference between the binary number values on lines 125 and 129 is obtained by a difference circuit in DCL circuit 127, and the difference so obtained is then compared with a pre-established tolerance value also supplied from reference tape 74. A ratio of difference value to tolerance value is obtained, in terms of percentage, and this percentage ratio is then used with logic sequence 75 to make machine override decisions.

DCL circuit 127 has several outputs. Under the established logic sequence shown, which may be altered to fit particular applications, no output is produced when the percentage ratio is less than 50%, i.e. when the difference is less than 50% of the established tolerance value, and the operation of N/C controller 62 and machine 64 is unchanged. If the percentage ratio is between 50% and 75%, the feedrate of machine 64 is reduced by an override signal on line 131, which overrides the basic feedrate instruction provided by N/C controller 62. If the percentage ratio is over 75%, machine 64 is shutdown by an override signal on line 133.

The above sequence occurs at each interrupt signal, which is produced at the end of each successive block. However, the same sequence occurs at selected intervals between interrupts as well. In the embodiment shown, the interval is 50 milliseconds, beginning at each interrupt.

As stated above, at the end of each block, the desired position of the cutting tool relative to the workpiece is present on reference tape 74. At the end of each block, then, comparisons can be made between a measured cutter position and a desired cutter position, from which override corrections can be made to N/C controller 62. Between blocks, however, the actual position of the cutter can be measured, but the desired position is not present on the reference tape as position data and instructions are provided only at the end of each block.

However, it is still desirable to monitor the performance of the machine, to continuously insure that the finished part will be within tolerance and to recognize quickly any machine malfunction. This is done with the aid of a calculator circuit conveniently termed a preprocessor 135. Preprocessor circuit 135 is used to make calculations using known principles of solid geometry to provide desired data.

At the end of one block, and hence the beginning of the next, preprocessor 135 has available to it the XYZ coordinates of the desired location of the cutting tool relative to the workpiece at both the end of the block just ended and at the end of the block just beginning. Preprocessor 135 also knows, from tape 74, the configuration of the path the tool will take between those points, either a straight line or a programmed curve. Preprocessor 135 then makes a calculation, based on known principles of plane geometric relationships, of the major component (X, Y or Z) of the desired cutting line connecting the two cutter locations points mentioned above specified from the reference tape.

For instance, it may be that in a particular block the cutter should cut a straight line which is coincident with the X axis of the workpiece, i.e. referring to FIG. 3, the only movement of the machine would be in the X axis direction, by table 16. In that case, the X axis would be the major component selected by preprocessor 135. Likewise, any cutting line having specified beginning and termination points defined by X, Y and Z components will have a major lineal component. The selection of the major component of the cutting line in a particular block occurs shortly after the interrupt signal, which indicates the end of one block and the start of another, but before the first 50 ms interval is completed.

At the end of the first 50 ms period following an interrupt, the data from the one position register (117, 118, 119) which corresponds to the component selected, e.g. register 117 if the X component is selected, is applied over line 137 through switch 138 to preprocessor 135.

After preprocessor 135 receives the data for one position component from the selected position register, it then makes a theoretical calculation of what the other two position components should be at that point along the cutting line, again by means of known principles of plane geometry and the known path of the cutting line over the block. After this calculation has been made, so that all three (X, Y Z) components are known, preprocessor 135 produces the desired machine position value resultant by means of a squaring and summing circuit, and then combines that resultant with the desired deflection value from the reference tape, and produces a reference value for cutter position relative to workpiece position.

This reference value is then applied over line 139 to DCL circuit 127. Concurrently, at each 50 ms interval, data from registers 90-94 is processed as described above to produce a resultant on line 125. DCL circuit 127 then operates as described above to produce override outputs on lines 131 and 133, like it does at each interrupt. Between interrupts, however, the override signals provided at the past interrupt cannot be lessened, only increased. Hence, feedrate can be decreased or increased at interrupts, but only decreased between interrupts. The process described immediately above is repeated every 50 ms, until the next interrupt occurs, at which point all of the desired reference data is obtained from reference tape 74.

The machining of the part continues, block by block, until it is completed. Such a monitoring control system, as described above, permits more rapid material removal during initial phases of machining and slower, more accurate material removal during final finishing. During initial cuts and at low risk areas, the tolerance value can be set high to allow for maximum feedrates, deflections, and stopping distances, thus minimizing machining time without risking an out-of-tolerance final product.

After the majority of the material has been removed in minimal machining time, the tolerance value can be reduced, resulting in slower feedrates, minimum tool deflection and virtually zero overrun to assure a final product within tolerance limits.

The system of the present invention thus eliminates the possibility of part rejection and hence, eliminates the need for expensive quality control inspection apparatus, as well as concurrently monitoring the operation of the machine itself, serving to detect any machine malfunction which would otherwise lead to out-of-tolerance machining and major breakdowns.

Although an exemplary embodiment of the invention has been disclosed herein for purposes of illustration, it should be understood that various changes, modifications and substitutions may be incorporated in such embodiment without departing from the spirit of the invention as defined by the claims which follow. For instance, although the operation of the monitoring system has been described in primarily hardware terms, it should be understood that similar results can be obtained by implementing the functions described herein in software for use on a digital computer.

What is claimed is:

1. In a numerical control machine tool comprising:
    (a) first means for supporting a workpiece relative to a machine reference position such that the position of the workpiece can be ascertained;
    (b) second means for supporting a cutting tool means relative to said machine reference position such that the undeflected position of the cutting tool means can be ascertained;
    (c) cutting tool means operable to remove material from the workpiece when the machine tool is in operation, said cutting tool means deflecting from a rest position during removal of material from the workpiece;
    (d) means for moving said first and second supporting means such that the workpiece and the cutting tool move relative to each other;
    (e) means for controlling the movement of the first and second supporting means in accordance with programmed instructions, so as to produce a product of selected configuration and size;
the improvement comprising:
    (a) means for determining the position of said first and second supporting means relative to the machine reference position at a given point in time;
    (b) means for determining the deflection of said cutting tool means from said rest position during operation of said machine tool at said given point in time;
    (c) means for combining the position data and the deflection data in such a manner as to produce a resultant which is representative of the actual position of the cutting tool means relative to the workpiece at said given point in time; and
    (d) means responsive to (1) said resultant, (2) reference data representative of the desired position of the cutting tool means relative to the workpiece at said given point in time, and (3) a preestablished tolerance value to alter the operation of said machine tool, when the difference between said resultant and said reference data reaches a predetermined fraction of said tolerance value, in such a manner as to insure that said product will be within the preestablished tolerance.

2. An apparatus of claim 1, wherein said deflection data is in the form of a plurality of deflection signals, each deflection signal being representative of the amount of deflection of said cutting tool means in one axis of deflection thereof, and wherein said position data is in the form of a plurality of position signals, each position signal being representative of the change of position of said machine tool in one axis of movement thereof; and wherein said apparatus includes a first square and sum means for squaring said deflection signals, summing the squared deflection signals, and taking the square root of the squared and summed deflection signals, a second square and sum means for squaring, summing and square rooting said position signals, and third square and sum means for squaring, summing and square rooting the outputs of said first and second square and sum means, the output of said third square and sum means being said resultant.

3. An apparatus of claim 2, including a plurality of temporary storage means, a plurality of sampling means, and means for controlling said sampling means, and wherein said apparatus includes means applying each deflection signal and each position signal to a temporary storage means, wherein, in operation of said apparatus, said sampling means in response to a programmed instruction samples said deflection signals and said position signals from said temporary storage means at preselected intervals.

4. An apparatus of claim 3, wherein said operation altering means includes means for slowing the feedrate of the machine tool when the difference between said resultant and said reference data is within a first predetermined range relative to said tolerance value and for stopping the operation of said machine tool when said difference is above said first predetermined range.

5. An apparatus of claim 1, wherein said apparatus includes a calculation means, which includes means for calculating the cutting path of said cutting tool means between two known points on said workpiece; means applying a selected position signal to said calculation means at selected intervals during the actual cutting of said cutting path, means for calculating the theoretical values of the remaining position signals; means combining said selected position signal and said calculated position signals with desired deflection data into a reference value representative of the desired position of said cutting tool means relative to said workpiece, and means applying said reference value to said operation altering means.

6. A method for monitoring a machine tool operating under the initial control of programmed instructions, comprising the steps of:
   (a) initiating machining operation in which a cutting tool removes material from a workpiece under the control of the programmed instructions;
   (b) determining the change in position of the machine tool from a reference position at a particular point in time during machining operations, so as to determine the position of the undeflected cutting tool relative to the workpiece;
   (c) determining the deflection of the cutting tool from a rest position at the particular point in time;
   (d) combining the data obtained as a result of steps (b) and (c) above in such a manner as to produce a resultant which is representative of the actual position of the cutting tool relative to the workpiece at the particular point in time;
   (e) calculating the difference between (1) said resultant and (2) a reference value obtained from the programmed instructions which is representative of the desired position of the cutting tool relative to the workpiece;
   (f) comparing the difference obtained as a result of step (e) above with a preestablished tolerance value obtained from the programmed instructions;
   (g) continuing the control of the machine tool exclusively by the programmed instructions if the difference of step (e) is within a first range relative to the tolerance value;
   (h) modifying the programmed instructions to decrease the feedrate of the machine tool if the difference of step (e) is within a second range relative to the tolerance value; and
   (i) stopping the machine tool if the difference of step (e) is greater than said second range.

7. The method of claim 6, wherein the position data of step (b) is in the form of a plurality of position signals, each position signal being representative of the change of position of said machine tool in one axis of movement thereof, and wherein the deflection data of step (c) above is in the form of a plurality of deflection signals, each deflection signal being representative of the amount of deflection of said cutting tool in one axis of deflection thereof, and wherein step (d) includes the following steps: squaring said position signals, summing the squared position signals and taking the square root of the squared and summed position signals; squaring said deflection signals, summing the squared deflection signals, and taking the square root of the squared and summed deflection signals; and squaring, summing and taking the square root of the respective squared, summed and square rooted position and deflection signals, the signal produced thereby being the resultant.

* * * * *